United States Patent [19]

Cairns et al.

[11] 4,098,722

[45] Jul. 4, 1978

[54] METHODS OF FABRICATING BODIES

[75] Inventors: James Anthony Cairns, Wantage; Michael Lesney Noakes, Reading, both of England

[73] Assignee: United Kingdom Atomic Energy Authority, London, England

[21] Appl. No.: 711,970

[22] Filed: Aug. 5, 1976

[30] Foreign Application Priority Data

Aug. 20, 1975 [GB] United Kingdom ............... 34671/75

[51] Int. Cl.² ............................................. B01J 21/04
[52] U.S. Cl. ......................... 252/466 J; 252/477 R; 29/157 R; 72/187
[58] Field of Search ................ 252/477, 466 J; 29/180 S, 180 SS, 157 R; 52/630; 113/116 Y; 72/187

[56] References Cited

U.S. PATENT DOCUMENTS

| 1,517,633 | 12/1924 | Junkers | 29/180 SS |
| 2,160,677 | 5/1939 | Romanoff | 52/630 |
| 3,217,845 | 11/1965 | Reynolds et al. | 52/630 |
| 3,966,646 | 6/1976 | Noakes et al. | 252/477 R |
| 3,992,330 | 11/1976 | Noakes et al. | 252/477 R |

FOREIGN PATENT DOCUMENTS 753,658  7/1956  United Kingdom ................. 252/477

Primary Examiner—Lowell A. Larson
Attorney, Agent, or Firm—Larson, Taylor and Hinds

[57] ABSTRACT

The method comprises the steps of: forming one or more sheets of material in a single sheet of material with at least one generally planar region and at least one region of first corrugations. Second corrugations which are smaller than the first corrugations are then superimposed on the, or each, generally planar region and the, or each, corrugated region. The generally planar region, or regions are then laid onto the region, or regions that are provided with the first corrugations.

19 Claims, 5 Drawing Figures

METHODS OF FABRICATING BODIES

This invention relates to methods of fabricating bodies which are constructed to have channels extending through them.

One way of fabricating such bodies is to lay together two or more corrugated sheets, which have identical parallel corrugations in such a way that adjacent sheets touch along their crests. It is customary to join the sheets together along the crests of the corrugations. It is, however, very difficult to position each sheet accurately relative to the other when producing such bodies on a production line. It is particularly difficult to avoid nesting of crests of one sheet into the valleys of an adjacent sheet. This problem is even greater in those cases where it is not possible to join the sheets together, but where it is desired to maintain the sheets in contact with one another. Similarly, if a single corrugated sheet is wound upon itself to form a coil, it is difficult to prevent the crests of one layer nesting in the valleys of the next inner layer.

One way of lessening these problems has been to bond a separate plain uncorrugated sheet to the corrugated sheet. In this way, the plain sheet serves as a dividing wall which prevents the crest of the corrugations of each layer resting in the valley of adjacent layers when the sheets are made up. Here again, during production it is necessary to have two sources of sheets, one of which has passed through the corrugating rolls and the other not. The corrugated sheet has to be fed to the corrugating rolls at a faster rate than the speed of movement of the plain uncorrugated sheet, so that when the sheets are brought together and joined they are moving together at the same velocity. Since the sheets are bonded together the end product at this stage of production is fairly easy to handle, and there is very little difficulty in laying up such duplex sheets to form the desired final body, having voids or channels extending through it.

However, there are instances where it is not possible to join the sheets together, for example, in those instances where to do so would damage the sheet or coating applied to the sheet. There are also instances where it is uneconomic to introduce a joining step in the production of the final article. In these instances, it is difficult to lay up such duplex sheets to form the desired final body.

In our copending application Ser. No. 519,016 now U.S. Pat. No. 3,966,646 there is disclosed methods of manufacturing bodies which comprise alternate layers of corrugated and uncorrugated sheets, made from a single sheet of material.

The final bodies produced by the methods described above are suitable as supports for catalysts; in this case the bodies when fabricated are coated with a catalytic material. There are numerous ways of applying catalytic material to such bodies, and in one technique, as described in our copending application Ser. No. 529,244 now U.S. Pat. No. 3,957,692 the completed body is provided with a continuous adherent surface layer of a carrier material by a wash coating process. For example, the body is dipped into an aquasol of the carrier material which is then allowed to dry on the body.

One of the problems encountered with depositing the carrier material by a wash-coating process is that there is a tendency for the carrier material to run off the body as it is removed from the sol, and thereby deplete certain areas of the body of the carrier material.

According to one aspect of the present invention there is provided a method of manufacturing a body having one or more channels extending therethrough, which method comprises the steps of: forming one or more sheets of material with at least one generally planar region; forming one or more sheets of material with at least one region of first corrugations; working the sheets to superimpose on the, or each, generally planar region and the, or each, corrugated region, a set of second corrugations which are smaller than the first corrugations; and laying the generally planar region, or regions, onto the region, or regions, that are provided with the first corrugations.

According to a further aspect of the present invention there is provided a method of manufacturing a body having one or more channels extending therethrough, which method comprises the steps of: forming a single sheet of material with at least one generally planar region and at least one region of first corrugations; working the, or each, planar region, and the, or each, region of first corrugations, so as to superimpose on them a set of second corrugations which are smaller than the first corrugations; and laying the single sheet of material onto itself in a manner so as to provide two or more layers of the material and locate the generally planar region of one layer alongside a region of the second corrugations of an adjacent layer; the channel or channels being formed by spacing between adjacent layers.

According to yet a further aspect of the present invention there is provided a method of manufacturing a body having a single continuous strip of material layered to provide alternate corrugated and generally planar contiguous sheets, the method comprising steps of working a single strip of the material to form along the strip, alternate planar regions and regions provided with a first set of corrugations, superimposing on the generally planar regions and the region of the strip, a second set of corrugations which are smaller than the first corrugations, and laying the generally planar regions of the strip onto the regions provided with the first corrugations, or vice versa, to form contiguous alternate corrugated and generally planar layers.

According to yet a further aspect of the present invention there is provided a body having one or more channels extending therethrough, the body comprising one or more generally planar sheets of material and one or more sheets of material which are provided with a set of first corrugations, the generally planar sheet, or sheets, lying on the corrugated sheet, or sheets, and the spaces between the sheets defining the channels that extend through the body, both the corrugated and generally planar sheets having superimposed thereon a second set of corrugations which are smaller than the first corrugations.

Preferably the said set of second corrugations is provided on the strip before working the strip to provide it with the set of the said first corrugations.

In the case where the body is constructed from a single strip of material which has been worked to provide it with alternate generally planar regions and regions of first corrugations, the step of laying the generally planar regions of the strip onto the corrugated regions may be carried out by folding the strip in a zig-zag manner about transverse axes spaced along the strip, in this case, the final body may be in the form of a stack of contiguous or alternate corrugated and generally planar layers. Alternatively, the laying step may be accomplished by winding the strip into a coil. Preferably in this case, the length of each region of the strip, prior to winding the strip into a coil, is at least equal to the circumference, or length of lap, onto which the respective region is wound. That is to say, that the final product has successive windings comprising alternately one revolution of corrugated strip, followed by one revolution of the generally planar strip, with both the corrugated regions and the generally planar regions having superimposed thereon the second set of corrugations.

It is possible, however, to construct each winding (i.e. one complete revolution) of the strip, with a plurality of alternate planar regions and corrugated regions, provided that the planar and corrugated regions of successive windings are positioned relative to the layer onto which it is wound so that progressing radially there are alternate layer of planar and corrugated regions.

In the case where the strip is worked to provide only one region which is provided with the first corrugations, and one region which is generally planar, the laying step may comprise folding the strip about an axis adjacent the intersection between the regions, and coiling the folded strip upon itself starting at the intersection, thereby simultaneously winding the generally planar region and the corrugated regions to form a coil which has, progressing radially, alternate layers of corrugated and generally planar sheets.

Preferably, the crest and valleys of the first corrugations extend in a direction transverse to the length of the strip so that the final product has corresponding transverse channels extending between the layers. Alternatively, the crests and valleys of the first corrugations may extend in a direction along the length of the strip so that the final product has channels extending in a direction along the strip between adjacent layers.

The whole strip or parts of the strip may be perforated, for example, some or all of the planar or corrugated regions may be foraminated. The strip may be made of any desired material depending upon the intended use of the body, for example, the strip may be made from an electrically conductive material, such as a metal, for example, an aluminium bearing ferritic steel (one such type of ferritic steel is Fecralloy steel, a registered Trade Mark of the United Kingdom Atomic Energy Authority); or a ceramic material such as alumina or silicon nitride, or a ferro-electric material having a perovskite type of crystal structure, for example, lanthanum barium titanate.

The body may form a catalyst support, such as for example, for use in catalysing combustion products of the exhaust gases of an internal combustion engine, in which case the catalyst may comprise a noble metal such as platinum or palladium.

The strip may be fabricated from any other substrate which forms a support for a catalyst or may be made from a material which is itself a catalyst, similarly the body may be used to effect pyrolysis if the strip of material is made from, or coated with a material which will effect pyrolysis of a fluid flowing along the channels between the adjacent layers.

In one specific construction embodying the present invention a body manufactured according to any one of the methods of the present invention further comprises providing the material with a continuous adherent surface layer of carrier material at least part of which comprises a gel, firing the gel and depositing a catalytic material onto the surface layer.

One way of depositing the catalytic material can be achieved by bombarding a source of the catalytic material in the neighbourhood of the surface layer with energetic ions; the conditions of atmosphere and selectivity of ions permitted to bombard the catalytic material being such that co-deposition upon the surface layer of unwanted material is reduced.

By energetic ions is meant ions having sufficient energy to cause useful sputtering of the source material. Impurities deposited upon the substrate from the atmosphere in which the sputtering is carried out, or impurities arising from deposition of the bombarding ions themselves upon the substrate, may render the catalyst inactive or diminish its activity. On the other hand, some impurities deposited in this way may be tolerated. We therefore propose that the conditions of atmosphere and selectivity of ions permitted to bombard this source material are carefully controlled to avoid impairing the activity of the product catalyst. Thus, by "unwanted material" it is meant material which in the quantity codeposited in practice of the method of the invention, unacceptably impairs the catalytic activity of the product.

An alternative method of depositing the catalytic material onto the surface layer is to form a slurry containing the catalytic material and to wash coat the slurry onto the surface layer.

A number of products constructed in accordance with the method of the present invention will now be described by way of examples, with reference to the accompanying drawings, in which.

In the following examples the end products are intended for use as a catalyst in an exhaust gas purification system for an internal combustion engine. The strip is made of an aluminium bearing ferritic steel of the type known as FECRALLOY (Registered Trade Mark of the United Kingdom Atomic Energy Authority) to which is applied a catalytic material, such as for example, platinum or palladium metal. The strip of Fecralloy steel is 0.002 inches (0.5 mm) thick, 4 inches (101.6 mm) wide and of various lengths.

Figure 1:
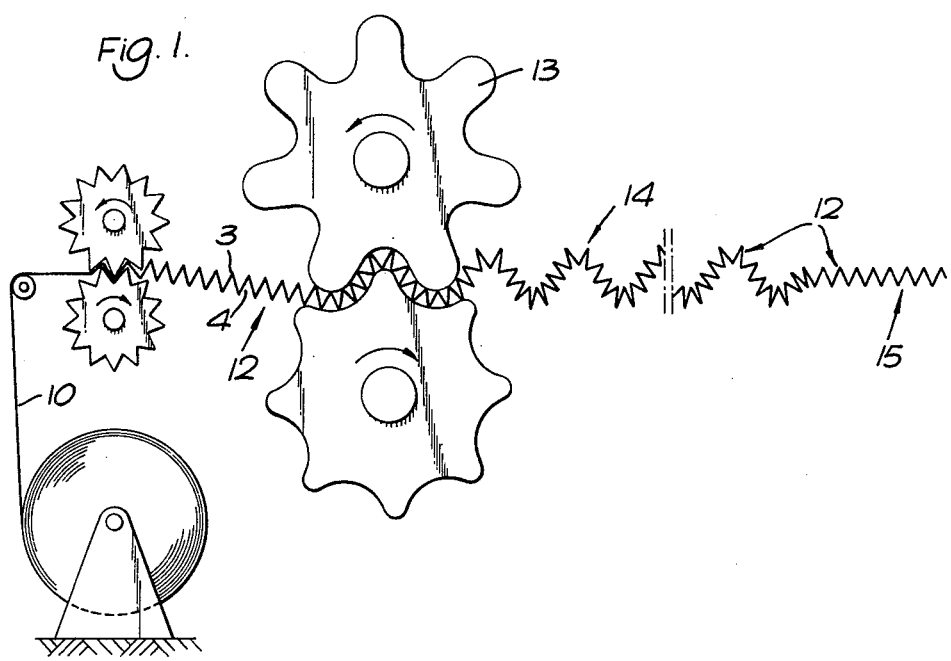
FIG. 1 shows, schematically, a cross-sectional view of part of a strip of metal worked in accordance with the present invention to provide the strip with a generally planar region and a corrugated region, both of which have superimposed thereon a set of miniature corrugations.
Figure 2:
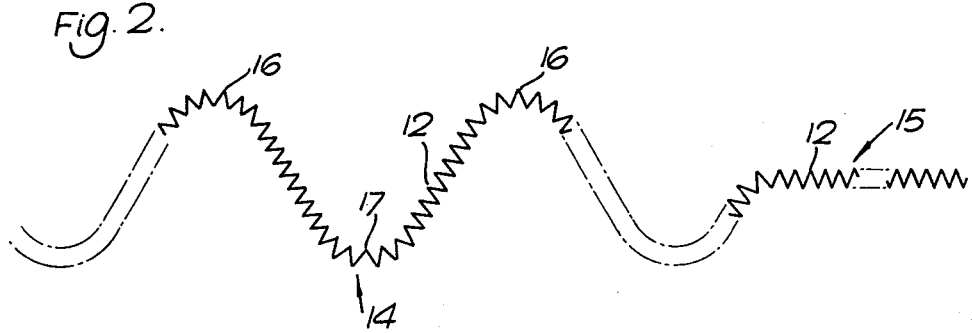
FIG. 2 shows in greater detail a cross-sectional view of part of the strip shown in FIG. 1.

Referring to FIG. 1 a length of plain uncorrugated strip 10 is passed through the nip of two corrugating rolls 11 to provide it with a set of miniature corrugations 12 typically 0.002 to 0.009 inches (0.05 to 0.229 mm) from crest to crest, with a pitch of 0.002 to 0.009 inches (0.05 to 0.229 mm). The miniature corrugations 12 extend along the longitudinal axis of the strip 10 but the strip can be regarded as being generally planar. In the examples shown, crests 3 and valleys 4 of the miniature corrugations 12 extend in a direction transverse to the longitudinal axis of the strip 10. The generally planar strip is then passed through the nip of two large corrugating rolls 13 and the strip is advanced through the rolls 13 so as to provide it with a corrugated region 14. The corrugations 14 are typically 0.03 and 0.04 inches (0.076 to 1.0 mm) from crest to crest and have a pitch of 0.03 to 0.04 inches (0.076 to 1.0 mm). The corrugating rolls 13 are then moved out of engagement with the strip and the strip is then advanced past the rolls 13 so as to leave a generally planar region 15 which has the miniature corrugations 12 superimposed on it. The rolls 13 are then moved back into engagement with the strip 10 to form a further corrugated region 14 which extends along the strip 10. The crests 16 and valleys 17 of the corrugations 14 extend in a direction transverse to the longitudinal axis of the strip. By working the strip 10 as described above, the strip is provided with alternate corrugated regions 14 and generally planar regions 15, each of which have a miniature corrugation 12 superimposed on it as shown in FIG. 2. The crests and valleys of the miniature corrugations 12 may lie parallel to those of the corrugations 14 or may be at any angle to them.

By controlling the speed of movement of the strip 10 through the rolls 13 and the time interval that the rolls 13 are in or out of contact with the strip 10, it is possible to adjust the lengths of the respective corrugated or generally planar regions 14 or 15.

Figure 3:
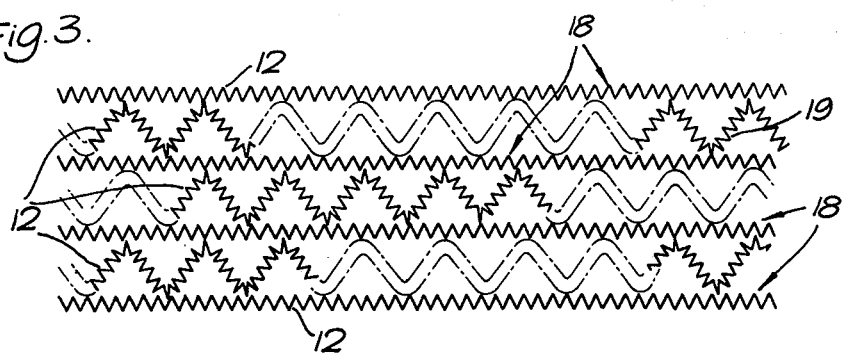
FIG. 3 shows a body constructed by laying separate generally planar sheets of material onto corrugated sheets of material. Both the generally planar sheets and the corrugated sheets have superimposed thereon a set of miniature corrugations.
Figure 4:
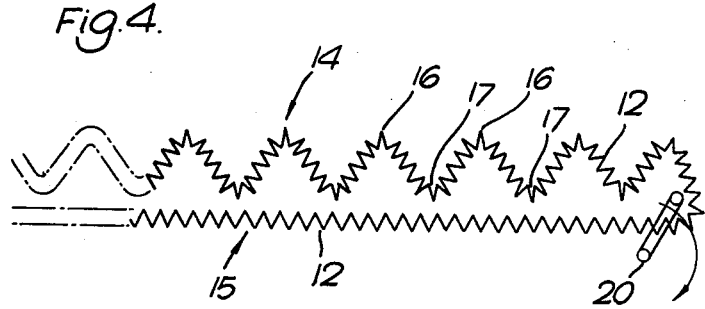
FIG. 4 shows a cross-sectional view of a strip of metal worked in accordance with the present invention and folded about a transverse axis located between a generally planar region and a region of corrugations.

Referring to FIG. 3, there is shown a body constructed from two sets of sheets of metal 18, 19; one set of sheets 18 being generally planar but having superimposed thereon the corrugations 12, whilst the other set of sheets 19 are corrugated with the miniature corrugations 12 superimposed on the large corrugations 14. The separate sheets may be joined at selected places where they touch.

Figure 5:
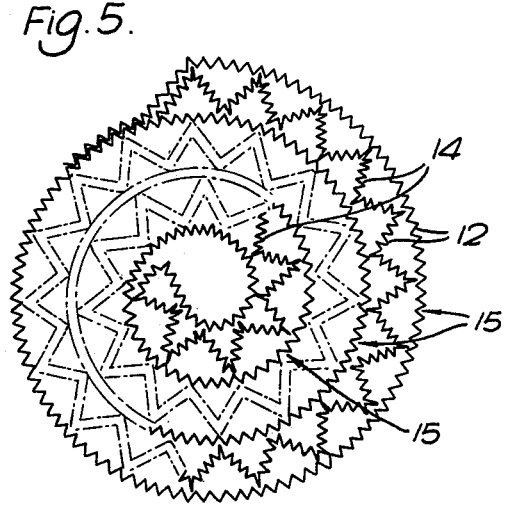
FIG. 5 shows a body fabricated by winding the strip shown in FIG. 4 into a coil.

Instead of making the body from two sets of separate sheets, the body may be constructed from a single sheet of metal worked to provide it with one generally planar region 15 and one corrugated region 14 (both regions 14 and 15 having superimposed thereon the miniature corrugations 12). In this instance, the strip 10 is folded about a transverse axis located at the intersection between the generally planar region 15 and the corrugated region 14. The strip 10 so folded, is then wound into a coil, commencing the winding at the region where the strip is folded at the intersection between the generally planar region 15 and the corrugated region 14. The winding process may be achieved by inserting a two pronged folding tool 20 into position at the intersection between the generally planar region 15 and the corrugated region 14. One prong of the tool 20 is arranged to lie across the strip normal to the longitudinal axis of the strip on one side of the strip 10, whilst the other prong of the tool 20 lies across the strip on the other side. By rotating the two pronged tool 20 about an axis extending normal to the longitudinal axis of the strip 10 the generally planar region 15 may be caused to lie alongside the corrugated region 14. Further rotation of the tool 20 will wind the strip 10 into a coil which, progressing radially outward, comprises, effectively, alternate layers of generally planar sheets 15 and corrugated sheets 14, each of which has superimposed thereon the miniature corrugations 12 as shown in FIG. 5.

The cross-sectional shape of the corrugations 12 or 14 may be of any desired form. For example, they may be a a succession of alternate inverted and non-inverted "V" or "U" shapes, or rectangular channels, or maybe of sinusoidal form.

In a specific construction of a catalyst for insertion in the exhaust gas flow of an internal combustion engine, bodies were fabricated from a strip of aluminium bearing ferritic alloy (Fecralloy steel), comprising 15% Cr; 4% Al; 0.3% Y; and the remainder Fe. Two sets of sheets were made up; one set comprised generally planar sheets worked to provide them with the miniature corrugations 12 and the other set comprised corrugated sheets provided with the large corrugations 14 on which the miniature corrugations 12 are superimposed. Alternate generally planar and corrugated sheets were stacked on one another to form a complete body having channels extending therethrough. The completed body was then oxidised by heating it in air to about 1000° C for 24 hours to form an alumina layer on its surfaces.

The bodies were then dipped into an alumina sol (containing crystallites of dimensions Ca 100 A) which had been prepared by adding 5 g of a dispersible gel of hydrous alumina (containing 75% by weight $Al_2O_3$) to 100 ml of deionised water. The bodies were then removed from the sol, drained and allowed to dry slowly overnight. The bodies were then placed in an air furnace and the temperature raised gradually at a rate of about 300° C/hour to 1100° C) and held at 1100° C for 4 hours in order to fire the bodies.

The bodies were then removed from the furnace and platinum was deposited onto the carrier material. The platinum may be deposited on the carrier material either by a vapour deposition process, a sputtering process or a wash coating process.

In a further specific construction of a catalyst for insertion in the exhaust gas flow of an internal combustion engine, the bodies may be constructed from preoxidised FECRALLOY steel (Registered Trade Mark), and the corrugations 12 and 14 formed on the oxidised strip. In this case, the completed bodies may then be dipped in the above mentioned aquasol of the carrier material which additionally contains a few drops of 1% solution of BDH Nonidet P40 wetting agent (polyvinyl alcohol) and a small quantity of 2.5% solution of MOVIOL N85-88 binder (an octyl phenol ethylene oxide condensate). The carrier material is then allowed to dry and platinum may then be deposited on the dried carrier material as described above.

The provision of the miniature corrugations 12 superimposed on the generally planar region 15 and the corrugated region 14 ensures that when the bodies are wash coated with the alumina sol, (or subsequently wash coated with a slurry containing the catalytic material), the sol (or the slurry) coats the strip in a uniform manner.

Even though the miniature corrugations were formed on the sheet prior to working it to form the corrugations 14, it was found that the subsequent working of the sheet did not deform the corrugations 12 to any unacceptable degree. However, if desired the corrugations 12 may be formed simultaneously with the corrugations 14 by modifying the surface contour of the corrugating rolls 13. It may be possible to provide the corrugations 12 after the corrugations 14 have been formed. However in these cases it is necessary to work the planar regions 15 separately with corrugating rolls to provide them with the corrugations 12.

We claim:

1. A method of making a catalyst body having a plurality of channels extending therethrough comprising the steps of:

working at least one sheet of metal to provide at least one generally planar region and at least one region of first corrugations;

working said at least one sheet of metal to superimpose on each generally planar region and on each region of first corrugations, a set of second corrugations smaller than the first corrugations;

laying each generally planar region onto a region of first corrugations to fabricate a body having planar regions alongside regions of first corrugations with said second corrugations superimposed on the planar regions and the regions of first corrugations;

dipping the body into an aqueous wash coating composition comprising a carrier material for a catalyst, removing the body from the aqueous solution, and drying the body to provide a wash coated layer of said carrier material thereon; and depositing a catalytic material on the wash coating of carrier material;

the size of said second corrugations being such that when the body is removed from the aqueous wash coating composition, a uniform layer of the wash coating composition is retained on the body.

2. A method according to claim 1 wherein the second corrugations are from 0.002 to 0.009 inches crest to crest and 0.002 to 0.009 inches in pitch.

3. A method according to claim 1 wherein said first corrugations extend lengthwise across said metal sheet.

4. A method according to claim 3 wherein said second corrugations extend longitudinally across said body.

5. A method according to claim 1 wherein said generally planar region and said region of first corrugations are provided on a single sheet of metal.

6. A method according to claim 5 wherein said body is fabricated from said single sheet of metal.

7. A method according to claim 6 wherein said body is fabricated by winding said single sheet into a coil.

8. A method according to claim 1 wherein said second set of corrugations is provided on said metal strip before the first corrugations are provided thereon.

9. A method according to claim 1 wherein said catalytic material is deposited on said body by wash coating a slurry containing catalytic material onto the layer of carrier material.

10. A method according to claim 1 wherein said second corrugations extend lengthwise across said metal sheet at an angle to said first corrugations.

11. A catalyst body having a plurality of channels therethrough comprising:

at least one sheet of metal having at least one generally planar region and at least one region of first corrugations;

each generally planar region being disposed adjacent a region of first corrugations;

said generally planar regions and said regions of first corrugations each bearing a superimposed set of second corrugations smaller than said first corrugations and having a pitch of 0.002 to 0.009 inches and being from 0.002 to 0.009 inches crest to crest;

a uniform layer of a wash-coated catalyst carrier material coated on the planar and corrugated surfaces of said body; and a catalytic material deposited on said layer of carrier material.

12. A catalyst body according to claim 1 wherein said first corrugations extend lengthwise across said metal sheet.

13. A catalyst body according to claim 12 wherein said second corrugations extend lengthwise across said metal sheet.

14. A catalyst body according to claim 13 wherein said second corrugations extend lengthwise at an angle with respect to the first corrugations on which they are superimposed.

15. A catalyst body according to claim 11 wherein said planar regions and said regions of first corrugations are both provided on a single sheet of metal.

16. A catalyst body according to claim 15 wherein said body comprises said single sheet of metal.

17. A catalyst body according to claim 15 wherein said single sheet of metal is wound in the form of a coil.

18. A catalyst body according to claim 11 wherein the first and second corrugations are parallel.

19. A catalyst body according to claim 11 wherein said metal comprises an aluminum-bearing ferritic steel.

* * * * *